(12) United States Patent
Henault

(10) Patent No.: US 12,465,701 B2
(45) Date of Patent: Nov. 11, 2025

(54) DEVICE FOR DISPENSING A FLUID PRODUCT

(71) Applicant: APTAR FRANCE SAS, Le Neubourg (FR)

(72) Inventor: Olivier Henault, Surville (FR)

(73) Assignee: APTAR FRANCE SAS, Le Neubourg (FR)

(*) Notice: Subject to any disclaimer, the term of this patent is extended or adjusted under 35 U.S.C. 154(b) by 248 days.

(21) Appl. No.: 18/036,777

(22) PCT Filed: Nov. 12, 2021

(86) PCT No.: PCT/FR2021/052004
§ 371 (c)(1),
(2) Date: May 12, 2023

(87) PCT Pub. No.: WO2022/101589
PCT Pub. Date: May 19, 2022

(65) Prior Publication Data
US 2023/0405246 A1    Dec. 21, 2023

(30) Foreign Application Priority Data
Nov. 13, 2020 (FR) ...................................... 2011677

(51) Int. Cl.
*A61M 15/00* (2006.01)
*A61M 11/00* (2006.01)
*A61M 15/08* (2006.01)

(52) U.S. Cl.
CPC ...... *A61M 15/0065* (2013.01); *A61M 11/007* (2014.02); *A61M 15/0036* (2014.02); *A61M 15/004* (2014.02); *A61M 15/08* (2013.01)

(58) Field of Classification Search
CPC ............ A61M 15/0065; A61M 11/007; A61M 15/0036; A61M 15/004; A61M 15/08;
(Continued)

(56) References Cited

U.S. PATENT DOCUMENTS 4,017,007 A * 4/1977 Riccio ..................... B05B 11/06
222/631
5,307,953 A 5/1994 Regan
(Continued)

FOREIGN PATENT DOCUMENTS

WO    2014/147329 A1    9/2014
WO    2019/008260 A1    1/2019
WO    2019/220062 A1    11/2019

OTHER PUBLICATIONS

International Search Report for PCT/FR2021/052004 dated Feb. 22, 2022.
(Continued)

*Primary Examiner* — Ishal Pancholi
(74) *Attorney, Agent, or Firm* — Sughrue Mion, PLLC

(57) ABSTRACT

Device for dispensing a fluid product, having a body, a reservoir containing one or two doses of a fluid product, the reservoir having a stopper that closes off the reservoir in a sealed manner before actuation, a dispensing head provided with a dispensing orifice, and an actuating mechanism for dispensing at least a portion of the fluid product through the dispensing orifice during actuation. The dispensing head receives an insert having a channel that connects, during actuation, the reservoir to the dispensing orifice. The stopper has a hollow axial sleeve suitable for sliding within the reservoir during actuation, the hollow axial sleeve being closed off before actuation by a deformable radial membrane. The insert has a point suitable for piercing the membrane of the stopper at the time of actuation, and a piston suitable for sliding in a sealed manner within the reservoir during actuation.

8 Claims, 1 Drawing Sheet

Figure 1:
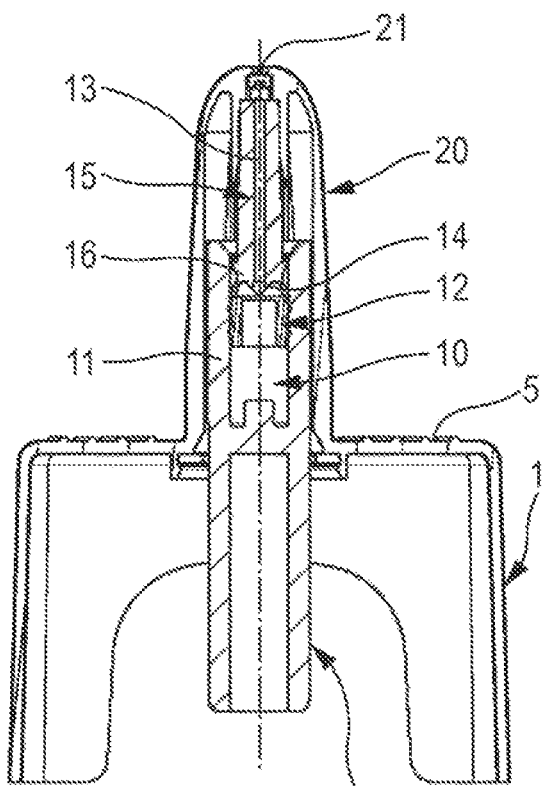

(58) Field of Classification Search
CPC .. A61M 2202/0468; A61M 2205/0216; B05B 11/02
See application file for complete search history.

(56) References Cited

U.S. PATENT DOCUMENTS

| | | | | |
|---|---|---|---|---|
| 6,626,379 | B1* | 9/2003 | Ritsche | B05B 11/0078 239/303 |
| 7,299,949 | B2* | 11/2007 | Greiner-Perth | B05B 11/02 222/320 |
| 10,232,127 | B2* | 3/2019 | Petit | A61M 5/31591 |
| 2005/0284890 | A1* | 12/2005 | Heldt | B65D 83/765 222/321.7 |
| 2016/0068326 | A1* | 3/2016 | Le Maner | B65D 83/76 222/23 |
| 2020/0254465 | A1* | 8/2020 | Brouet | A61M 11/007 |

OTHER PUBLICATIONS

International Preliminary Report on Patentability dated Feb. 7, 2023 in International Application No. PCT/FR2021/052004.

* cited by examiner

DEVICE FOR DISPENSING A FLUID PRODUCT

This Application is a National Stage of International Application No. PCT/FR2021/052004 filed Nov. 12, 2021, claiming priority based on French Patent Application No. 2011677 filed Nov. 13, 2020.

The present invention relates to a device for dispensing a fluid product.

More particularly, the present invention relates to a device for dispensing a fluid product including a fluid product dispensing head for dispensing one or two doses of a pharmaceutical fluid product. In that type of device, generally referred to as a single-dose or two-dose device, each dose of fluid product, which is generally a liquid, is dispensed or sprayed through a dispensing orifice while the device is being actuated manually. If the device is a single-dose device, all of the fluid product is dispensed in a single actuation. If the device is a two-dose device, the fluid product is dispensed in two successive actuations of the device.

Generally, that type of single-dose or two-dose device is used for dispensing fluid product nasally, orally, or sublingually. For nasal dispensing, the dispensing head then includes an axial extension that is adapted to penetrate into a user's nostril during use.

That type of device may present certain drawbacks.

Thus, devices of the single-dose or two-dose type generally use a hollow metal needle to pierce the stopper during actuation. However, the use of a metal needle is expensive, and makes the recycling of the device after use more complex. Furthermore, when the stopper is pierced by the needle, particles of elastomer can become detached from the stopper and pollute the fluid that is dispensed. Moreover, holding the needle is difficult to guarantee, with the risk of the device malfunctioning.

Moreover, the reservoir containing the fluid product is generally made of glass, which implies manufacturing tolerances that are greater than for a molded plastic part, in particular as regards the internal diameter of the reservoir, which can have an impact on the sealing of the device. Furthermore, the use of glass also complicates the recycling of the device.

Documents WO2014147329A1, WO2019220062A1, U.S. Pat. No. 5,307,953 and WO2019008260A1 describe prior-art devices.

An object of the present invention is to provide a device for dispensing a fluid product that does not have the above-mentioned drawbacks.

More particularly, an object of the present invention is to provide a device that limits the risk of malfunction.

Another object of the present invention is to provide such a device that improves the reliability of the device.

Another object of the present invention is to provide such a device that improves the recycling of the device.

Another object of the present invention is to provide such a device that is simple and inexpensive to manufacture and to assemble.

The present invention thus provides a device for dispensing a fluid product comprising a body, a reservoir containing one or two doses of a fluid product, the reservoir comprising a stopper that closes off the reservoir in a sealed manner before actuation, a dispensing head provided with a dispensing orifice, and dispensing means for dispensing at least a portion of the fluid product through the dispensing orifice during actuation, the dispensing head receiving an insert comprising a channel that connects, during actuation, the reservoir to the dispensing orifice, wherein:

the stopper comprises a hollow axial sleeve suitable for sliding within the reservoir during actuation, the hollow axial sleeve being closed off before actuation by a deformable radial membrane, and the insert comprises a point suitable for piercing the membrane of the stopper at the time of actuation, and a piston suitable for sliding in a sealed manner within the reservoir during actuation.

Advantageously, said insert is stationary relative to said body.

Advantageously, said piston surrounds said point.

Advantageously, said membrane deforms, in particular bulges upwards, when the pressure in said reservoir increases during actuation.

Advantageously, said membrane has a thickness that is less than 0.5 mm, advantageously about 0.3 mm.

Advantageously, said actuating means comprise an actuating body that is secured to said reservoir for moving it axially relative to said body.

Advantageously, said reservoir and said actuating body are made integrally as a single piece.

Advantageously, said reservoir contains one single dose of fluid product, dispensed during one single actuation.

In a variant, said reservoir contains two doses of fluid product, dispensed during two successive actuations.

Figure 2:
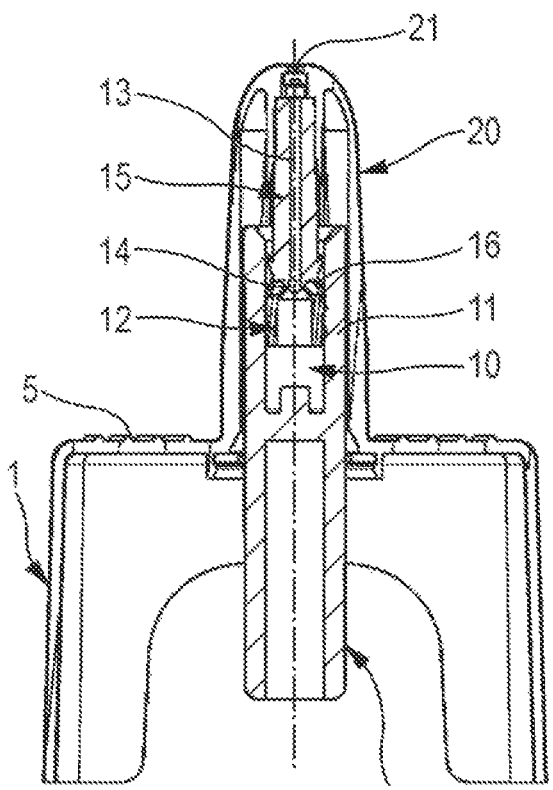
Figure 3:
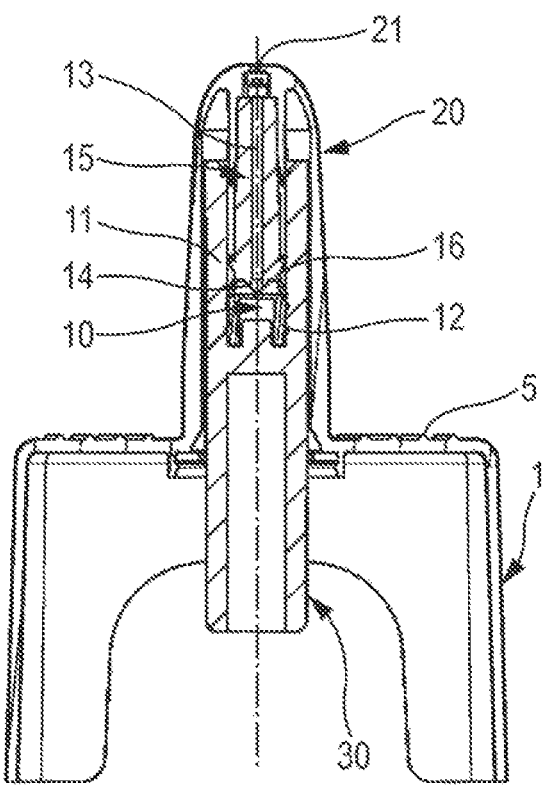
Figure 4:
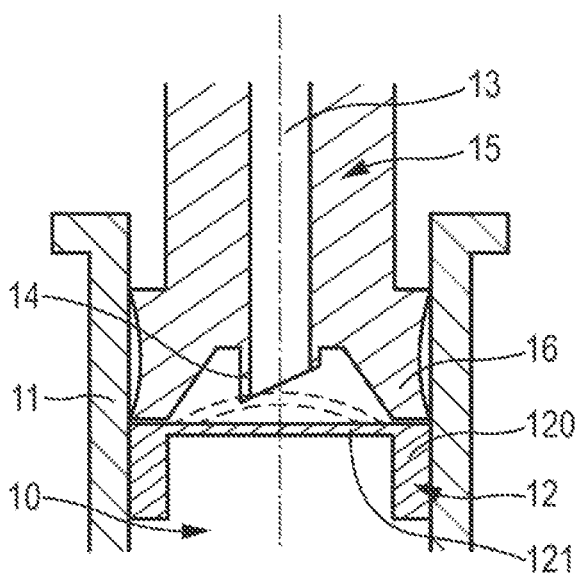

These and other characteristics and advantages of the present invention appear more clearly from the following detailed description, given by way of non-limiting examples, and with reference to the accompanying drawings, and in which:

FIG. 1 is a diagrammatic section view of a device for dispensing a fluid product according to a first advantageous embodiment, in the rest position, FIG. 2 is a view similar to the view in FIG. 1, during actuation, FIG. 3 is a view similar to the view in FIG. 2, after actuation; and FIG. 4 is a diagrammatic detailed view of the device in FIGS. 1 to 3.

The terms "axial" and "radial" are relative to the longitudinal central axis of the device. The term "top" refers to the upright position of the device shown in figures.

FIG. 1 shows an example of a nasal fluid product dispensing device to which the present invention applies. In this example, the device is a single-dose device in which all of the dose of fluid product is dispensed in a single actuation. It should be observed that the present invention could also be adapted to other types of device, e.g. such as devices of the two-dose type, containing two doses of fluid product to be dispensed in two successive actuations of the device.

The device includes a body 1 including a radial flange 5 on which the user's fingers bear during actuation.

A dispensing head 20, in this example of the nasal type, extends axially from said radial flange 5 and includes a dispensing orifice 21 that is oriented axially. The dispensing orifice 21 serves to dispense a dose of fluid product out from said dispensing head 20 while the device is being actuated by a user, such dispensing being performed by dispenser means. Advantageously, the nasal dispensing head 20 is made integrally with said body 1. It should be observed that the present invention could also apply to a device including an oral dispensing head. More generally, the present invention applies to all types of single-dose or two-dose devices.

The body 1 receives a reservoir 10. Typically, the reservoir 10 may be formed by a body 11 that is hollow and blind, including a single opening that is closed by a stopper 12 and containing a single dose of fluid product to be dispensed during a single actuation of the device. Naturally, in the context of a two-dose device, the reservoir 10 could contain two doses of fluid product to be dispensed in two successive actuations.

The stopper 12 comprises a hollow axial sleeve 120 which, during actuation, slides within the reservoir 10, said hollow axial sleeve 120 being closed off before actuation by a deformable radial membrane 121. This membrane 121 can deform, in particular bulge upwards, when the pressure in the reservoir 10 increases, as illustrated by the dotted lines in FIG. 4. Typically, said membrane has a thickness that is less than 0.5 mm, advantageously about 0.3 mm.

The dispensing head 20 receives an insert 15 comprising a channel 13 that connects, during actuation, the reservoir 10 to the dispensing orifice 21. The channel 13 ends in a point 14 suitable for piercing the membrane 121 of the stopper 12 at the time of actuation. Preferably, this insert 15 is stationary relative to the body 1, and in particular relative to the dispensing orifice 21. The insert 15 includes a piston 16 suitable for sliding in a sealed manner within the reservoir 10 during actuation. As can be seen in FIG. 4, the piston 16 advantageously surrounds the point 14.

The invention therefore makes it possible to omit the metal needle from the prior-art devices, thereby making it possible to reduce the number of parts of the device, and thus to simplify manufacture and assembly. In addition, recycling is simplified by eliminating a material, specifically metal. Furthermore, by making the point 14 integrally as a single piece with the insert 15, the invention makes it possible to avoid the risks of the needle holding poorly that could appear in prior-art devices.

Actuating means may be provided so as to make it possible to actuate the device. In the example shown, these actuating means 30 comprise an actuating body 30 secured to the reservoir 10 so as to move it axially relative to the body 1 towards the dispensing orifice 21. During this movement, the point 14 pierces the stopper 12, then said stopper slides within the reservoir 10 together with the piston 16 so as to expel the product through said point 14.

In standard manner, the reservoir 10 may be made of glass and fastened in an actuating body made of plastic material. Advantageously, however, as shown in FIGS. 1 to 3, the reservoir 10 and the actuating body 30 are made in a single piece of plastic material, for example by molding. This makes it possible not only to eliminate a part of the device and thus to simplify manufacture and assembly, but also to guarantee that the internal diameter of the reservoir is more precise and more constant relative to a glass reservoir. In addition, recycling is simplified by eliminating a material, specifically metal.

Operation of the single-dose device shown in the figures is as follows.

In the rest position in FIG. 1, the stopper 12 isolates the contents of the reservoir 10 from the atmosphere. The insert 15 is in contact with or very close to the stopper 12 in this rest position. In particular, the point 14 is arranged in the immediate vicinity of the membrane 121.

When the user presses simultaneously on the radial flange 5 and on the bottom of the actuating member 30, he/she moves said actuating body 30 and thus the reservoir axially upwards relative to the dispensing head 20. When the reservoir 10 starts to move relative to the dispensing head 20, the pressure in the reservoir 10 will increase, which will deform the membrane 121 axially upwards, as illustrated in FIG. 2. This deformation causes the membrane 121 to be pierced by the point 14 of the insert 15 so as to put the inside of the reservoir 10 into communication with the channel 13.

Continued actuation causes the piston 16 of the insert and the hollow sleeve 120 of the stopper 12 to move simultaneously inside the reservoir 10, thereby causing the fluid product contained in the reservoir to be dispensed through the point 14, the channel 13, and the dispensing orifice 21.

As described above, the invention could also apply to a device of the two-dose type. In that configuration, the contents of the reservoir would be dispensed in two successive actuations. Document WO2014147329 describes an example of a two-dose device to which the present invention could apply.

Naturally, other variant embodiments may also be envisaged, without going beyond the scope of the present invention, as defined by the accompanying claims.

The invention claimed is:

1. A device for dispensing a fluid product, comprising a body, a reservoir containing one or two doses of a fluid product, the reservoir comprising a stopper that closes off the reservoir in a sealed manner before actuation, a dispensing head provided with a dispensing orifice, and actuating means for dispensing at least a portion of the fluid product through the dispensing orifice during actuation, the dispensing head receiving an insert comprising a channel that connects, during actuation, the reservoir to the dispensing orifice,
wherein:
said stopper comprises a hollow axial sleeve suitable for sliding within said reservoir during actuation, said hollow axial sleeve being closed off before actuation by a deformable radial membrane,
said insert comprises a point configured to pierce said membrane of said stopper at the time of actuation, and a piston configured to slide in a sealed manner within the reservoir during actuation, and
wherein:
said point and said piston form an integral one-piece construction with said insert,
said piston surrounds said point, and
said membrane deforms by bulging upwards when pressure in said reservoir increases during actuation.

2. The device according to claim 1, wherein said insert is stationary relative to said body during actuation.

3. The device according to claim 1, wherein said membrane has a thickness of less than 0.5 mm.

4. The device according to claim 1, wherein said actuating means comprise an actuating body secured to said reservoir for moving it axially relative to said body.

5. The device according to claim 4, wherein said reservoir and said actuating body are made integrally as a single piece.

6. The device according to claim 1, wherein said reservoir contains one single dose of fluid product, dispensed in one single actuation.

7. The device according to claim 1, wherein said reservoir contains two doses of fluid product, dispensed in two successive actuations.

8. The device according to claim 1, wherein said membrane has a thickness of about 0.3 mm.

* * * * *